United States Patent
Na et al.

(10) Patent No.: US 11,671,584 B2
(45) Date of Patent: Jun. 6, 2023

(54) INTER-PREDICTION METHOD AND VIDEO DECODING APPARATUS USING THE SAME

(71) Applicant: SK TELECOM CO., LTD., Seoul (KR)

(72) Inventors: Tae Young Na, Seoul (KR); Sun Young Lee, Seoul (KR); Kyung Hwan Ko, Seoul (KR); Se Hoon Son, Seoul (KR); Jae Il Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 76 days.

(21) Appl. No.: 17/320,419

(22) Filed: May 14, 2021

(65) Prior Publication Data

US 2021/0274164 A1    Sep. 2, 2021

Related U.S. Application Data

(63) Continuation of application No. PCT/KR2019/015548, filed on Nov. 14, 2019.

(30) Foreign Application Priority Data

Nov. 14, 2018  (KR) .......................... 10-2018-0140071
Jun. 10, 2019  (KR) .......................... 10-2019-0067741

(51) Int. Cl.
*H04N 19/105* (2014.01)
*H04N 19/159* (2014.01)
(Continued)

(52) U.S. Cl.
CPC ......... *H04N 19/105* (2014.11); *H04N 19/159* (2014.11); *H04N 19/176* (2014.11); *H04N 19/52* (2014.11)

(58) Field of Classification Search
None
See application file for complete search history.

(56) References Cited

U.S. PATENT DOCUMENTS

2020/0077106 A1 *   3/2020   Jhu ...................... H04N 19/139
2020/0107017 A1 *   4/2020   Hung .................. H04N 19/132
(Continued)

FOREIGN PATENT DOCUMENTS

KR    10-2018-0061060 A    6/2018
WO    2015-137783 A1    9/2015
(Continued)

OTHER PUBLICATIONS

Yang, Haitao et al., "CE4 summary report: Inter prediction and motion vector coding", Joint Video Experts Team (JVET) of ITU-T SG 16 WP 3 and ISO/IEC JTC 1/SC 29/WG 11, Ljubljana, SI, Jul. 10-18, 2018, 60 pages.
(Continued)

*Primary Examiner* — Lindsay J Uhl
(74) *Attorney, Agent, or Firm* — Hauptman Ham, LLP

(57) ABSTRACT

Disclosed are an inter-prediction method and an image decoding apparatus using the same. According to an embodiment of the present invention, there is provided an inter-prediction method including extracting a merge candidate flag and offset information from a bitstream, selecting a merge candidate corresponding to the extracted merge candidate flag from a merge candidate list including neighboring blocks of a current block as merge candidates, deciding a motion vector of the current block by applying the offset information to a motion vector of the selected merge candidate, and generating, as a prediction block of the current block, a block indicated by the motion vector of the current block in a reference picture referenced by the selected merge candidate.

8 Claims, 13 Drawing Sheets

(51) Int. Cl.
*H04N 19/176* (2014.01)
*H04N 19/52* (2014.01)

(56) References Cited

U.S. PATENT DOCUMENTS

2020/0112733 A1* 4/2020 Li ........................ H04N 19/513
2020/0366902 A1* 11/2020 Jeong ................... H04N 19/176
2021/0029362 A1* 1/2021 Liu ....................... H04N 19/189
2021/0152844 A1* 5/2021 Jeong .................... H04N 19/54

FOREIGN PATENT DOCUMENTS

WO  2016-068674 A1  5/2016
WO  2017-183751 A1  10/2017

OTHER PUBLICATIONS

International Search Report dated Feb. 11, 2020, corresponding to International Application No. PCT/KR2019/015548 citing the above reference(s).

* cited by examiner

INTER-PREDICTION METHOD AND VIDEO DECODING APPARATUS USING THE SAME

CROSS-REFERENCE TO RELATED APPLICATION

This application is a continuation of PCT/KR2019/015548, filed on Nov. 14, 2019, which is based on and claims priority to Korean Patent Application No. 10-2018-0140071 filed on Nov. 14, 2018 and Korean Patent Application No. 10-2019-0067741 filed on Jun. 10, 2019. The disclosures of above-listed applications are hereby incorporated by reference herein in their entirety.

TECHNICAL FIELD

The present invention relates to encoding and decoding of an image and, more particularly, to an inter-prediction method and a video decoding apparatus with improved encoding and decoding efficiency.

BACKGROUND ART

Since the volume of video data is larger than that of voice data or still image data, storing or transmitting video data without processing for compression requires a lot of hardware resources including memory.

Accordingly, in storing or transmitting video data, the video data is generally compressed using an encoder so as to be stored or transmitted. Then, a decoder receives the compressed video data, and decompresses and reproduces the video data. Compression techniques for such video include H.264/AVC and High Efficiency Video Coding (HEVC), which improves coding efficiency over H.264/AVC by about 40%.

However, the video size, resolution, and frame rate are gradually increasing, and accordingly the amount of data to be encoded is also increasing. Accordingly, a new compression technique having better encoding efficiency and higher image quality than the existing compression technique is required.

DISCLOSURE

Technical Problem

In order to meet this need, the present invention is directed to providing an improved image encoding and decoding technique. In particular, an aspect of the present invention is related to a technique that increases encoding and decoding efficiency by overcoming the limitation of accuracy of a conventional merge mode by additionally reflecting offset information in motion estimation.

Technical Solution

According to an aspect of the present invention, there is provided an inter-prediction method including extracting a merge candidate flag and offset information from a bitstream, selecting a merge candidate corresponding to the extracted merge candidate flag from a merge candidate list including neighboring blocks of a current block as merge candidates, deciding a motion vector of the current block by applying the offset information to a motion vector of the selected merge candidate, and generating, as a prediction block of the current block, a block indicated by the motion vector of the current block in a reference picture referenced by the selected merge candidate.

According to another aspect of the present invention, there is provided a video decoding apparatus including a decoder configured to extract a merge candidate flag and offset information from a bitstream, a selection unit configured to select a merge candidate corresponding to the extracted merge candidate flag from a merge candidate list including neighboring blocks of a current block as merge candidates, a motion vector determination unit configured to decide a motion vector of the current block by applying the offset information to a motion vector of the selected merge candidate; and a generation unit configured to generate, as a prediction block of the current block, a block indicated by the motion vector of the current block in a reference picture referenced by the selected merge candidate.

Advantageous Effects

As described above, according to an embodiment of the present invention, it is possible to implement more accurate motion estimation by overcoming the limitation of a conventional motion estimation method using offset information.

Also, according to another embodiment of the present invention, it is possible to minimize the number of bits required to signal offset information by expressing the offset information in as simplified a form as possible.

DETAILED DESCRIPTION

Figure 1:
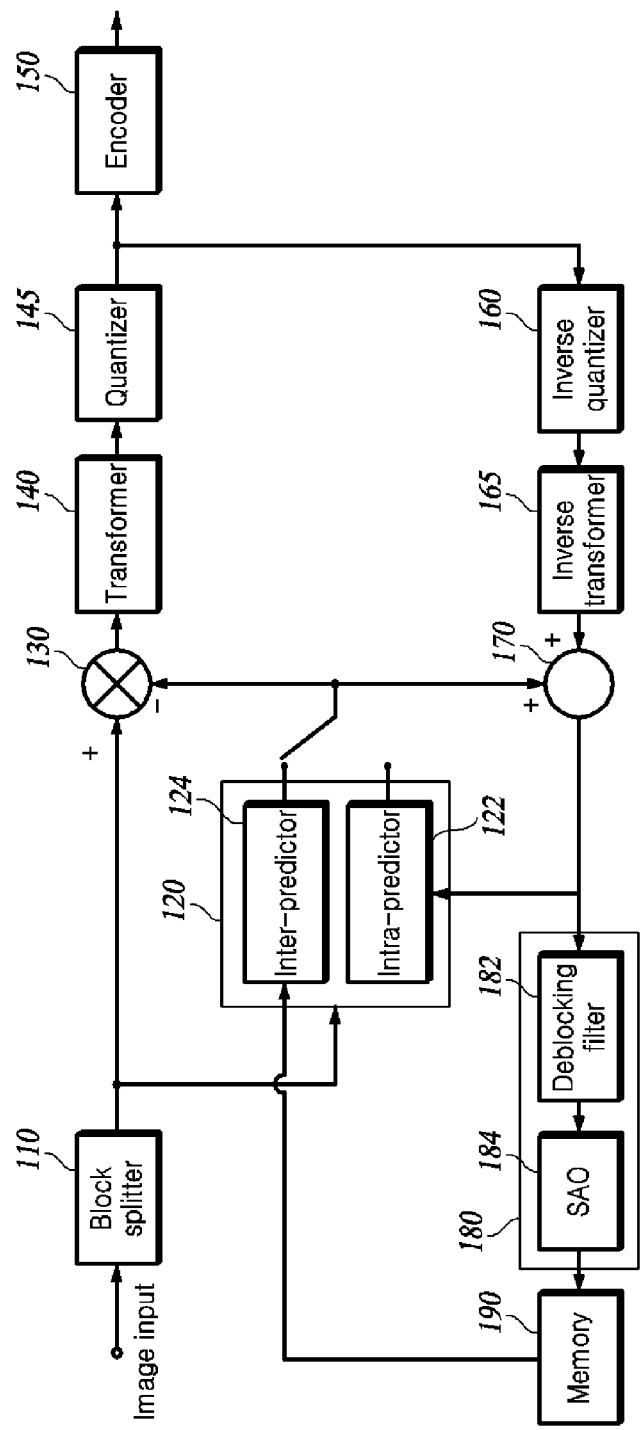
FIG. 1 is an exemplary block diagram of a video encoding apparatus capable of implementing the techniques of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

FIG. 1 is an exemplary block diagram of a video encoding apparatus capable of implementing the techniques of the present disclosure. Hereinafter, a video encoding apparatus and elements of the apparatus will be described with reference to FIG. 1.

The video encoding apparatus includes a block splitter 110, a predictor 120, a subtractor 130, a transformer 140, a quantizer 145, an encoder 150, an inverse quantizer 160, an inverse transformer 165, an adder 170, a filter unit 180, and a memory 190.

Each element of the video encoding apparatus may be implemented in hardware or software, or a combination of hardware and software. The functions of the respective elements may be implemented in software, and a microprocessor may be implemented to execute the software functions corresponding to the respective elements.

One video is composed of a plurality of pictures. Each picture is split into a plurality of regions, and encoding is performed on each region. For example, one picture is split into one or more tiles and/or slices. Here, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one tile in common is encoded as a syntax of the tile or encoded as a syntax of a tile group, which is a collection of multiple tiles, and information applied to all blocks constituting one picture is encoded in a picture parameter set (PPS) or a picture header. Further, information referred to by a plurality of pictures in common is encoded in a sequence parameter set (SPS). In addition, information referred to by one or more SPSs in common is encoded in a video parameter set (VPS).

The block splitter 110 determines the size of a coding tree unit (CTU). Information about the size of the CTU (CTU size) is encoded as a syntax of the SPS or PPS and is transmitted to the video decoding apparatus.

The block splitter 110 splits each picture constituting a video into a plurality of CTUs having a predetermined size, and then recursively splits the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) having the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QTBT (QuadTree plus BinaryTree) structure or a QTBTTT (QuadTree plus BinaryTree TernaryTree) structure may be used. Here, BTTTs may be collectively referred to as a multiple-type tree (MTT).

Figure 2:
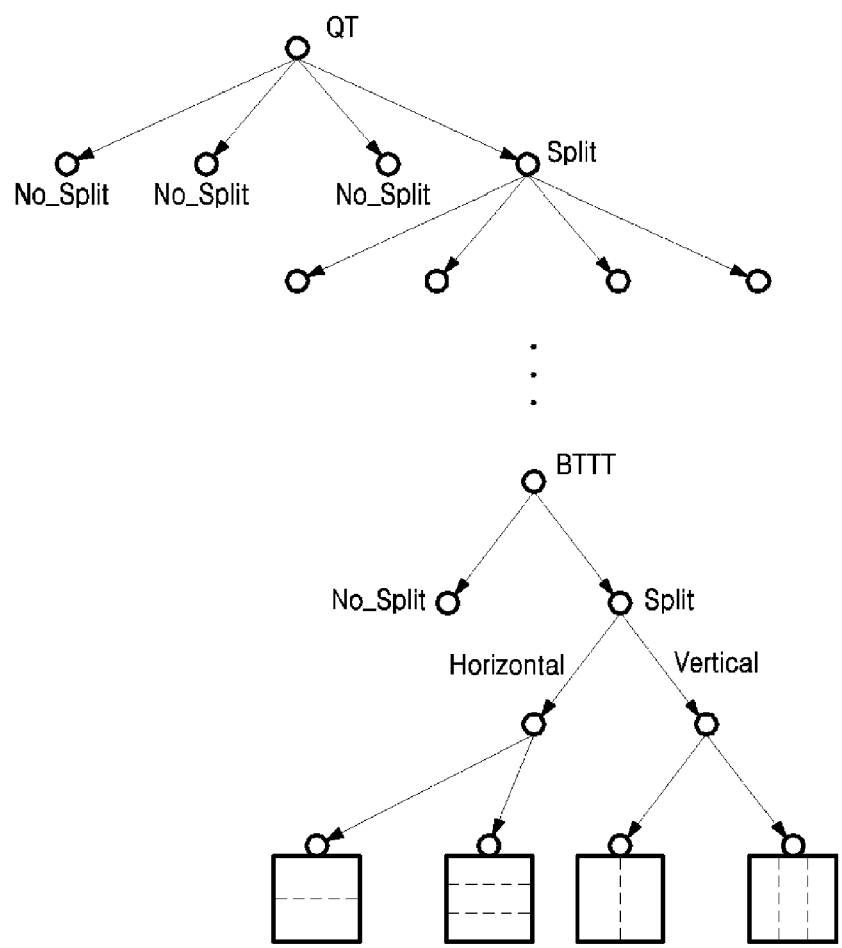
FIG. 2 exemplarily shows block partitioning structure using a QTBTTT structure.

FIG. 2 shows a QTBTTT splitting tree structure. As shown in FIG. 2, a CTU may be initially split in the QT structure. The QT splitting may be repeated until the size of the splitting block reaches the minimum block size (MinQT-Size) of a leaf node allowed in the QT. A first flag (QT_split_flag) indicating whether each node of the QT structure is split into four nodes of a lower layer is encoded and signaled to the video decoding apparatus by the encoder 150. When the leaf node of the QT is not larger than the maximum block size (MaxBTSize) of the root node allowed in BT, it may be further split in one or more of the BT structure or the TT structure. In the BT structure and/or the TT structure, there may be a plurality of splitting directions. For example, there may be two directions, which are horizontal splitting and vertical splitting of the block of the node. As shown in FIG. 2, when MTT splitting starts, a second flag (mtt_split_flag) indicating whether nodes are split, and a flag indicating a splitting direction (vertical or horizontal), and/or a flag indicating a splitting type (Binary or Ternary) are encoded and signaled to the video decoding apparatus by the encoder 150.

As another example of the tree structure, when a block is split using the QTBTTT structure, information about a CU split flag (split_cu_flag) indicating that the block has been split and a QT split flag (split_qt_flag) indicating whether the splitting type is QT splitting is encoded and signaled to the video decoding apparatus by the encoder 150. When the value of split_cu_flag indicates that the block has not been split, the block of the node becomes a leaf node in the splitting tree structure and is used as a coding unit (CU), which is a basic unit of encoding. When the value of split_cu_flag indicates that the block has not been split, whether the splitting type is QT or MTT is distinguished by the value of split_qt_flag. When the splitting type is QT, there is no additional information. When the splitting type is MTT, a flag (mtt_split_cu_vertical_flag) indicating the MTT splitting direction (vertical or horizontal) and/or a flag (mtt_split_cu_binary_flag) indicating the MTT splitting type (Binary or Ternary) are encoded and signaled to the video decoding apparatus by the encoder 150.

As another example of the tree structure, when QTBT is used, there may be two splitting types, which are horizontal splitting (i.e., symmetric horizontal splitting) and vertical splitting (i.e., symmetric vertical splitting) of a block of a node into two blocks of the same size. A split flag (split_flag) indicating whether each node of the BT structure is split into blocks of a lower layer and split type information indicating the splitting type are encoded and transmitted to the video decoding apparatus by the encoder 150. There may be an additional type, which is splitting a block of a node into two asymmetric blocks. The asymmetric splitting type may include a type of splitting a block into two rectangular blocks at a size ratio of 1:3, and a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block."

The predictor 120 predicts a current block to generate a predicted block. The predictor 120 includes an intra-predictor 122 and an inter-predictor 124.

In general, each of the current blocks in a picture may be predictively coded. Prediction of a current block may be performed using the technique of intra-prediction (which is performed based on the data from a picture containing the current block) or the technique of inter-prediction (which is performed based on the data from a picture coded before the picture containing the current block). Inter-prediction includes both uni-directional prediction and bi-directional prediction.

Figure 3:
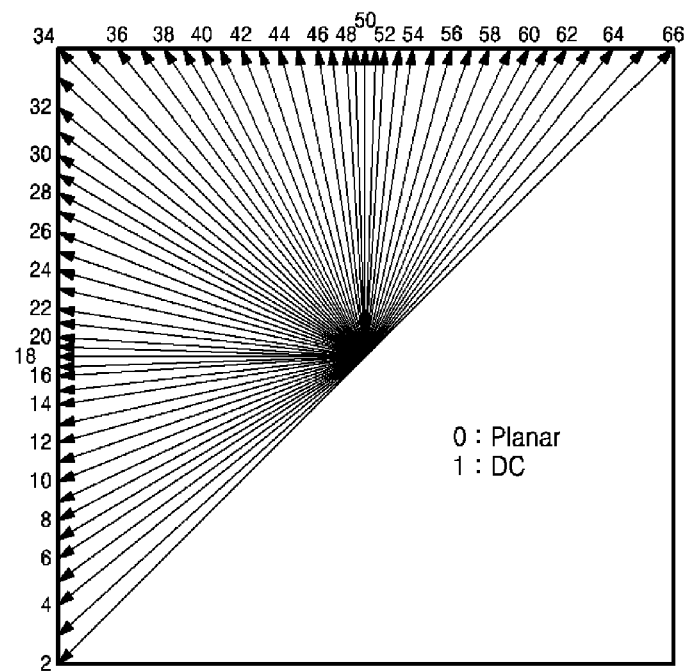
FIG. 3 exemplarily shows a plurality of intra-prediction modes.

The intra-predictor 122 predicts pixels in the current block using pixels (reference pixels) located around the current block in the current picture including the current block. There is a plurality of intra-prediction modes according to the prediction directions. For example, as shown in FIG. 3, the plurality of intra-prediction modes may include non-directional modes, which include a planar mode and a DC mode, and 65 directional modes. Neighboring pixels and an equation to be used are defined differently for each prediction mode.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes, and may select an intra-prediction mode that has the best rate distortion characteristics among the tested modes.

The intra-predictor 122 selects one intra-prediction mode from among the plurality of intra-prediction modes, and predicts the current block using neighboring pixels (reference pixel) and an equation determined according to the selected intra-prediction mode. Information about the selected intra-prediction mode is encoded by the encoder 150 and transmitted to the video decoding apparatus.

The inter-predictor 124 generates a predicted block for the current block through a motion compensation process. The inter-predictor searches for a block most similar to the current block in a reference picture encoded and decoded earlier than the current picture, and generates a predicted block for the current block based on the searched block. Then, the inter-predictor generates a motion vector corresponding to a displacement between the current block in the current picture and the predicted block in the reference picture. In general, motion estimation is performed on a luma component, and a motion vector calculated based on the luma component is used for both the luma component and the chroma component. Motion information including information on the reference picture used to predict the current block and information on the motion vector is encoded and transmitted to the video decoding apparatus by the encoder 150.

The subtractor 130 generates a residual block by subtracting the predicted block generated by the intra-predictor 122 or the inter-predictor 124 from the current block.

The transformer 140 transforms a residual signal in a residual block having pixel values in the spatial domain into a transform coefficient in the frequency domain. The transformer 140 may transform the residual signals in the residual block using the total size of the current block as a transformation unit. Alternatively, the transformer may split the residual block into sub-blocks of a transform region and non-transform region, and transform the residual signals using only the sub-block of the transform region as a transformation unit. Here, the transform region sub-block may be one of two rectangular blocks having a size ratio of 1:1 based on the horizontal axis (or vertical axis). In this case, a flag (cu_sbt_flag) indicating that only the subblock has been transformed, directional (vertical/horizontal) information (cu_sbt_horizontal_flag), and/or location information (cu_sbt_pos_flag) are encoded and signaled to the video decoding apparatus by the encoder 150. In addition, the size of the transform region sub-block may have a size ratio of 1:3 based on the horizontal axis (or vertical axis). In this case, a flag (cu_sbt_quad_flag) for distinguishing the splitting is additionally encoded signaled to the video decoding apparatus by the encoder 150.

The quantizer 145 quantizes transform coefficients output from the transformer 140, and outputs the quantized transform coefficients to the encoder 150.

The encoder 150 generates a bitstream by encoding the quantized transform coefficients using an encoding method such as Context-based Adaptive Binary Arithmetic Code (CABAC). The encoder 150 encodes information such as the CTU size, CU split flag, QT split flag, MTT splitting direction, and MTT splitting type related to block splitting, such that the video decoding apparatus splits the block in the same manner as the video encoding apparatus.

Further, the encoder 150 encodes information about a prediction type indicating whether the current block is encoded by intra-prediction or by inter-prediction, and encodes intra-prediction information (i.e., information about an intra-prediction mode) or inter-prediction information (information about a reference picture and a motion vector) according to the prediction type.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the predicted block generated by the predictor 120 to reconstruct the current block. The pixels in the reconstructed current block are used as reference pixels for intra-prediction of the next block.

The filter unit 180 filters the reconstructed pixels to reduce blocking artifacts, ringing artifacts, and blurring artifacts generated due to block-based prediction and transformation/quantization. The filter unit 180 may include a deblocking filter 182 and a sample adaptive offset (SAO) filter 184.

The deblocking filter 180 filters the boundary between the reconstructed blocks to remove blocking artifacts caused by block-by-block encoding/decoding, and the SAO filter 184 additionally filters the deblocking filtered video. The SAO filter 184 is a filter used to compensate for a difference between a reconstructed pixel and an original pixel caused by lossy coding.

The reconstructed blocks filtered through the deblocking filter 182 and the SAO filter 184 are stored in the memory 190. Once all blocks in one picture are reconstructed, the reconstructed picture is used as a reference picture for inter-prediction of blocks in the next picture to be encoded.

Figure 4:
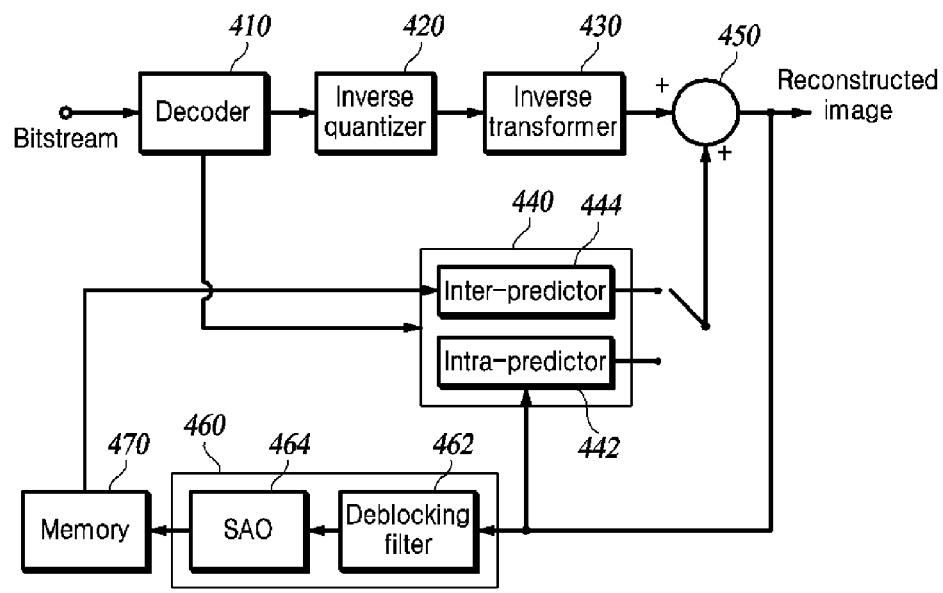
FIG. 4 is an exemplary block diagram of a video decoding apparatus capable of implementing the techniques of the present disclosure.

FIG. 4 is an exemplary functional block diagram of a video decoding apparatus capable of implementing the techniques of the present disclosure. Hereinafter, the video decoding apparatus and elements of the apparatus will be described with reference to FIG. 4.

The video decoding apparatus may include a decoder 410, an inverse quantizer 420, an inverse transformer 430, a predictor 440, an adder 450, a filter unit 460, and a memory 470.

Similar to the video encoding apparatus of FIG. 1, each element of the video decoding apparatus may be implemented as hardware or software, or may be implemented as a combination of hardware and software. In addition, the function of each element may be implemented as software, and a microprocessor may be implemented to execute the functions of software corresponding to each element.

The decoder 410 determines a current block to be decoded by decoding the bitstream received from the video encoding apparatus and extracting information related to block splitting, and extracts prediction information and information on residual signals necessary to reconstruct the current block.

The decoder 410 extracts information about the CTU size from the sequence parameter set (SPS) or the picture parameter set (PPS), determines the size of the CTU, and splits a picture into CTUs of the determined size. Then, the decoder determines the CTU as the uppermost layer, that is, the root node of a tree structure, and extracts splitting information about the CTU to split the CTU using the tree structure.

For example, when the CTU is split using the QTBTTT structure, a first flag (QT_split_flag) related to QT splitting is first extracted and each node is split into four nodes of a lower layer. Then, for a node corresponding to the leaf node of QT, a second flag (MTT_split_flag) related to MTT splitting and information on the splitting direction (vertical/horizontal) and/or splitting type (binary/ternary) are extracted, and the leaf node is split in the MTT structure. In this way, each node below the leaf node of the QT is recursively split in a BT or TT structure.

As another example, when a CTU is split using the QTBTTT structure, a CU split flag (split_cu_flag) indicating whether a CU is split is first extracted. If the corresponding block is split, a QT split flag (split_qt_flag) is extracted. When the splitting type is not QT but MTT, a flag (mtt_split_cu_vertical_flag) indicating the MTT splitting direction (vertical or horizontal) and/or a flag (mtt_split_cu_binary_flag) indicating the MTT splitting type (Binary or Ternary) is additionally extracted. In the splitting process, each node may be subjected to recursive QT splitting zero or more times, and then subjected to recursive MTT splitting zero or more times. For example, the CTU may be MTT-split immediately, or may only be QT-split multiple times.

As another example, when the CTU is split using the QTBT structure, the first flag (QT_split_flag) related to the QT spitting, and each node is split into four nodes of a lower layer. For a node corresponding to the leaf node of the QT, the split_flag indicating whether the node is further BT-split and splitting direction information are extracted.

Upon determining the current block to be decoded through tree structure splitting, the decoder 410 extracts information about a prediction type indicating whether the current block is subjected to intra-prediction or inter-prediction. When the prediction type information indicates intra-prediction, the decoder 410 extracts a syntax element for the intra-prediction information (intra-prediction mode) for the current block. When the prediction type information indicates inter-prediction, the decoder 410 extracts a syntax element for the inter-prediction information, that is, information indicating a motion vector and a reference picture referred to by the motion vector.

The decoder 410 extracts information about quantized transform coefficients of the current block as information about residual signals.

The inverse quantizer 420 inversely quantizes the quantized transform coefficients, and inversely transforms the inversely quantized transform coefficients from the frequency domain to the spatial domain to reconstruct residual signals to generate a residual block for the current block.

In addition, when the inverse transformer 430 inversely transforms only a partial region (sub-block) of a transform block, a flag (cu_sbt_flag) indicating that only a sub-block of the transform block has been transformed, and the direction information (vertical/horizontal) about the sub-block (cu_sbt_horizontal_flag) and/or sub-block location information (cu_sbt_pos_flag) are extracted. Then, residual signals are reconstructed by inversely transforming the transform coefficients of the sub-block from the frequency domain to the spatial domain. For the region that is not inversely transformed, the residual signal is filled with "0". Thereby, the final residual block for the current block is created.

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction.

The intra-predictor 442 determines an intra-prediction mode of the current block among a plurality of intra-prediction modes based on a syntax element for the intra-prediction mode extracted from the decoder 410, and predicts the current block based on the reference pixels around the current block according to the intra-prediction mode.

The inter-predictor 444 determines a motion vector of the current block and a reference picture referenced by the motion vector based on the syntax element for the intra-prediction mode extracted from the decoder 410, and predicts the current block based on the motion vector and the reference picture.

The adder 450 reconstructs the current block by adding the residual block output from the inverse transformer and the predicted block output from the inter-predictor or the intra-predictor. The pixels in the reconstructed current block are used as reference pixels for intra-prediction of a block to be decoded later.

The filter unit 460 may include a deblocking filter 462 and an SAO filter 464. The deblocking filter 462 performs deblocking filtering on the boundary between reconstructed blocks to remove blocking artifacts caused by block-by-block decoding. The SAO filter 464 performs additional filtering on a reconstructed block after deblocking filtering in order to compensate for a difference between the reconstructed pixel and the original pixel caused by lossy coding. The reconstructed block filtered through the deblocking filter 462 and the SAO filter 464 is stored in the memory 470. When all blocks in one picture are reconstructed, the reconstructed picture is used as a reference picture for inter-prediction of a block in a picture to be encoded thereafter.

Inter-prediction encoding/decoding methods (inter-prediction methods) may be largely classified into a skip mode, a merge mode, and an adaptive (or advanced) motion vector predictor (AMVP) mode.

In the merge mode (a conventional merge mode), the video encoding apparatus constructs a merge candidate list using motion information of neighboring blocks, selects the most optimal motion information, and then signals an index of a merge candidate having the selected most optimal motion information to the video decoding apparatus. The video decoding apparatus selects a merge candidate (a neighboring block) corresponding to the transmitted merge candidate index from the merge candidate list and uses the motion information of the selected neighboring block as the motion information of a current block.

Such a conventional merge mode has the advantage of effectively decreasing the amount of motion-related data by expressing, as one merge candidate index, multiple pieces of information such as prediction direction-related information (a prediction index), reference picture-related information (a reference picture index), a differential motion vector (a motion vector difference), and/or a predicted motion vector (a motion vector predictor).

However, since the conventional merge mode uses the motion information of the selected neighboring block as the motion information of the current block, it can be said that there is a certain limit in terms of motion estimation accuracy.

The present invention seeks to overcome the limitations of the conventional merge mode by improving the accuracy of prediction of the current block through a method of estimating the motion of the current block by utilizing additional information (offset information) in addition to the motion information of the selected neighboring block.

Figure 5:
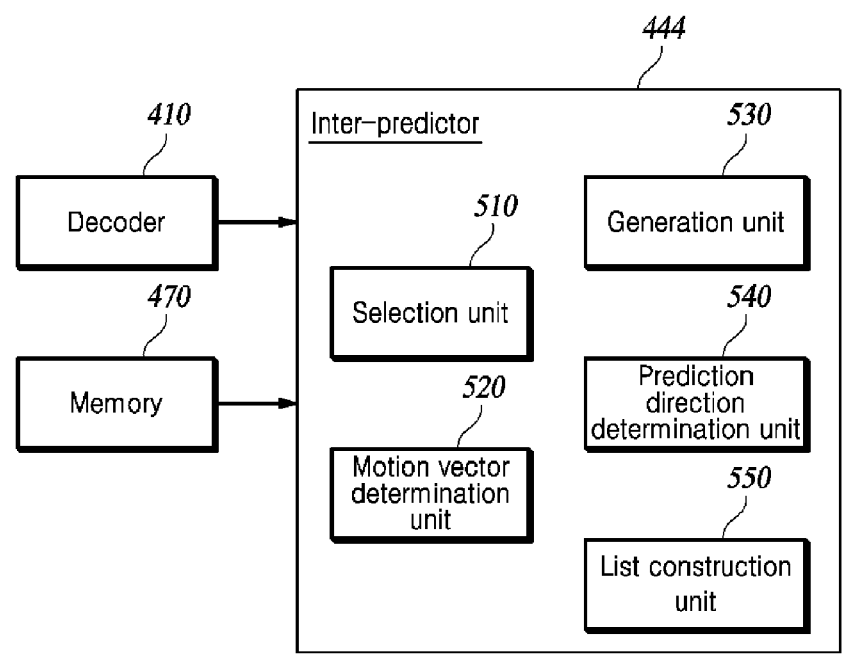
FIG. 5 is an exemplary block diagram of an inter-predictor capable of implementing the techniques of the present disclosure.
Figure 6:
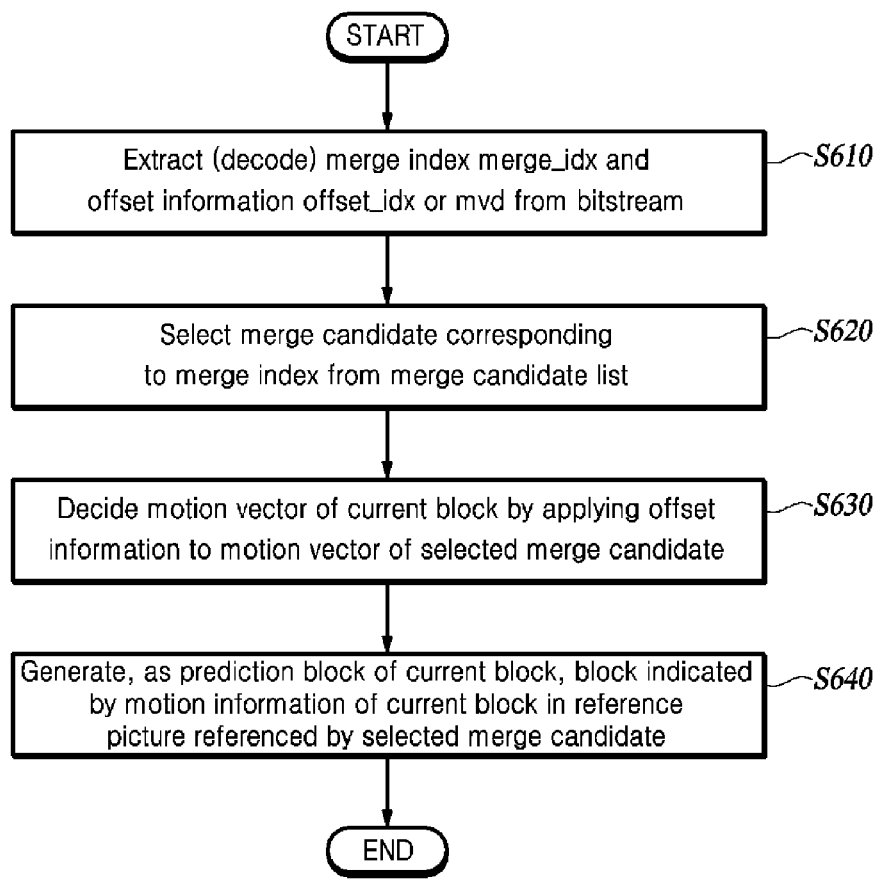
FIG. 6 is a flowchart illustrating an example of a method of predicting a current block using offset information.

As shown in FIG. 5, an inter-predictor 444, which is capable of implementing the techniques of the present disclosure, may include a selection unit 510, a motion vector determination unit 520, a generation unit 530, a prediction direction determination unit 540, and a list construction unit 550.

When a bitstream is transmitted from the video encoding apparatus, the decoder 410 extracts (decodes) offset information (offset_idx or mvd) and a merge index (merge_idx) from the transmitted bitstream (S610). The merge index is information indicating one merge candidate among some or all of one or more merge candidates included in a merge candidate list and may be implemented in a type of a merge candidate flag (e.g., mmvd_cand_flag) according to an embodiment.

The selection unit 510 selects a merge candidate corresponding to the decoded merge index from the merge candidate list (S620). The merge candidate list is composed of one or more neighboring blocks (merge candidates) of the current block, and a process of constructing the merge candidate list is performed by the list construction unit 550.

The motion vector determination unit 520 decides the motion vector of the current block using the motion vector of the selected merge candidate and the decoded offset information (S630). Specifically, the motion vector determination unit 520 decides a position shifted according to the offset information from a position indicated by the motion vector of the selected merge candidate, as the motion vector of the current block (S630).

Here, since the motion vector of the current block is decided by applying the offset information to the motion vector of the selected merge candidate, the motion vector of the selected merge candidate may be referred to as a first motion vector, an initial motion vector, or the like, and the motion vector of the current block may be referred to as a second motion vector, a final motion vector, or the like.

From a corresponding viewpoint, the position indicated by the motion vector of the selected merge candidate may be referred to as a first position, an initial position, or the like, and the position finally indicated by the offset information (the position indicated by the motion vector of the current block) may be referred to as a second location, a final location, or the like.

Meanwhile, the offset information is information indicating a relative position with respect to a first position indicated by a first motion vector, and the relative position corresponds to a position more optimized to accurately predict the current block than the first position indicated by the first motion vector.

The offset information may be implemented in various forms that can express magnitude and direction from a first position to a second position. For example, the offset information may be implemented in the form of an offset index offset_idx indicating one offset vector candidate among predefined offset vector candidates. As another example, the offset information may also be implemented in the form of a motion vector mvd corresponding to the difference between a first motion vector and a second motion vector. The implementations of the offset information will be described in detail below.

When the motion vector (the second motion vector) of the current block is decided, the generation unit 530 generates a block indicated by the decided second motion vector as a prediction block of the current block (S640). That is, the generation unit 530 performs prediction on the current block using the block indicated by the second motion vector. The block indicated by the second motion vector is placed in a reference picture referenced by the selected merge candidate.

Figure 7:
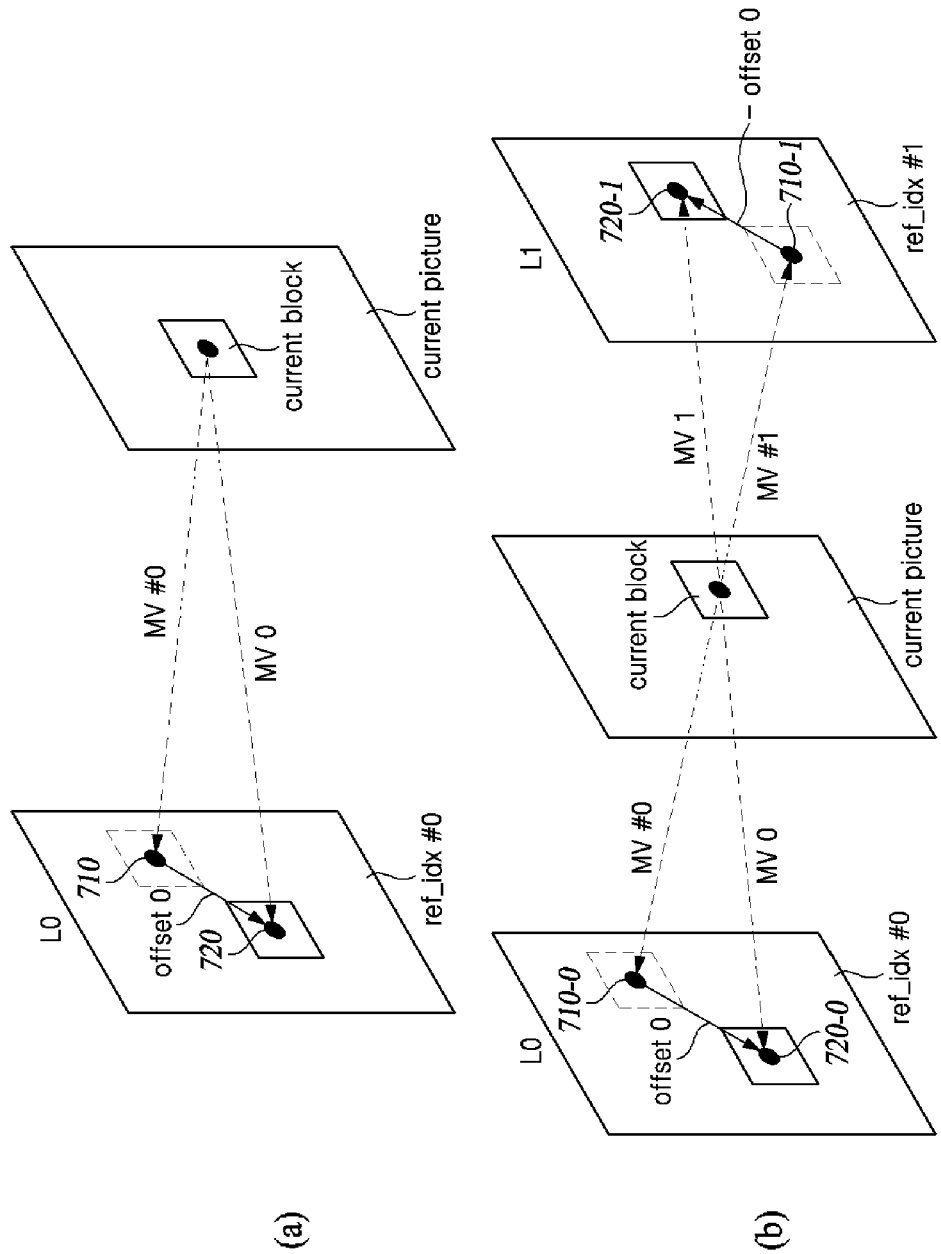
FIG. 7 is a diagram illustrating an example of a method of deciding a motion vector of a current block using offset information.

Examples of a method of deciding a second motion vector using a first motion vector and offset information are shown in FIG. 7. FIG. 7A shows an example of deciding the second motion vector when the first motion vector is unidirectional (L0) prediction, and FIG. 7B shows an example of deciding the second motion vector when the first motion vector is bidirectional (L0 and L1) prediction.

In FIG. 7, each of L0 and L1 represents a reference picture list. ref_idx_#0 represents reference picture information included in L0, and ref_idx_#1 represents reference picture information included in L1. current_block represents a block to be currently encoded or decoded, and current_picture represents a picture including the current block. A prediction direction (a reference picture list), reference picture information, the first motion vectors MV_#0 and MV_#1, and the like may be obtained from the motion information of the selected merge candidate.

In the case of unidirectional prediction in FIG. 7A, the inter-predictor 444 may decide a second motion vector MV_0 indicating a second position 720 by shifting the first motion vector MV_#0 indicating a first position 710 according to magnitude and direction indicated by offset information offset_0.

In the case of bidirectional prediction in FIG. 7B, the inter-predictor 444 may obtain a prediction direction (L0 and L1), reference picture information (ref_idx_#0 and ref_idx_#1), and first motion vectors (MV_#0 and MV_#1) from the motion information of the selected merge candidate.

For the L0 direction, the inter-predictor 444 may decide a second motion vector MV_0 indicating a second position 720-0 by shifting a first motion vector MV_#0 indicating a first position 710-0 according to magnitude and direction indicated by offset information offset_0.

For the L1 direction, the inter-predictor 444 may decide a second motion vector MV_1 indicating a second position 720-1 by shifting a first motion vector MV_#1 indicating a first position 710-1 according to magnitude indicated by the offset information offset_0 and a direction reverse to that of the offset information offset_0. Here, −offset_0 denotes offset information reverse to L0-direction offset information offset_0. In some embodiments, reverse offset information may be applied in the L0 direction, and (forward) offset information may be applied in the L1 direction.

In comparison with the conventional method that uses motion information of neighboring blocks as it is, the present invention improves accuracy of motion estimation by additional using offset information.

As described above, the offset information may be implemented in various forms that express the direction and magnitude of a first position relative to a second position. For example, the offset information may be implemented in the form of an index, a vector, or the like.

When the offset information is implemented in the form of an index (an offset index), the offset index may indicate one offset vector candidate among preset offset vector candidates. The video encoding apparatus assigns indexes to the preset offset vector candidates and transmits one of the indexes (offset indexes) to the video decoding apparatus.

In some embodiments, the offset index may indicate motion magnitude and motion direction of an offset vector candidate. For example, the offset index may be configured to include an offset index (e.g., mmvd_distance_idx) indicating the motion magnitude of the offset vector candidate and an offset index (e.g., mmvd_direction_idx) indicating the motion direction of the offset vector candidate.

The video decoding apparatus may decide the second motion vector by adding the offset vector candidate indicated by the transmitted offset index to the first motion vector. In other words, in view of the first position and the second position, the video decoding apparatus may decide, as the second motion vector, the position shifted by the offset vector candidate specified by the offset index (the second position) from the first position.

Figure 8:
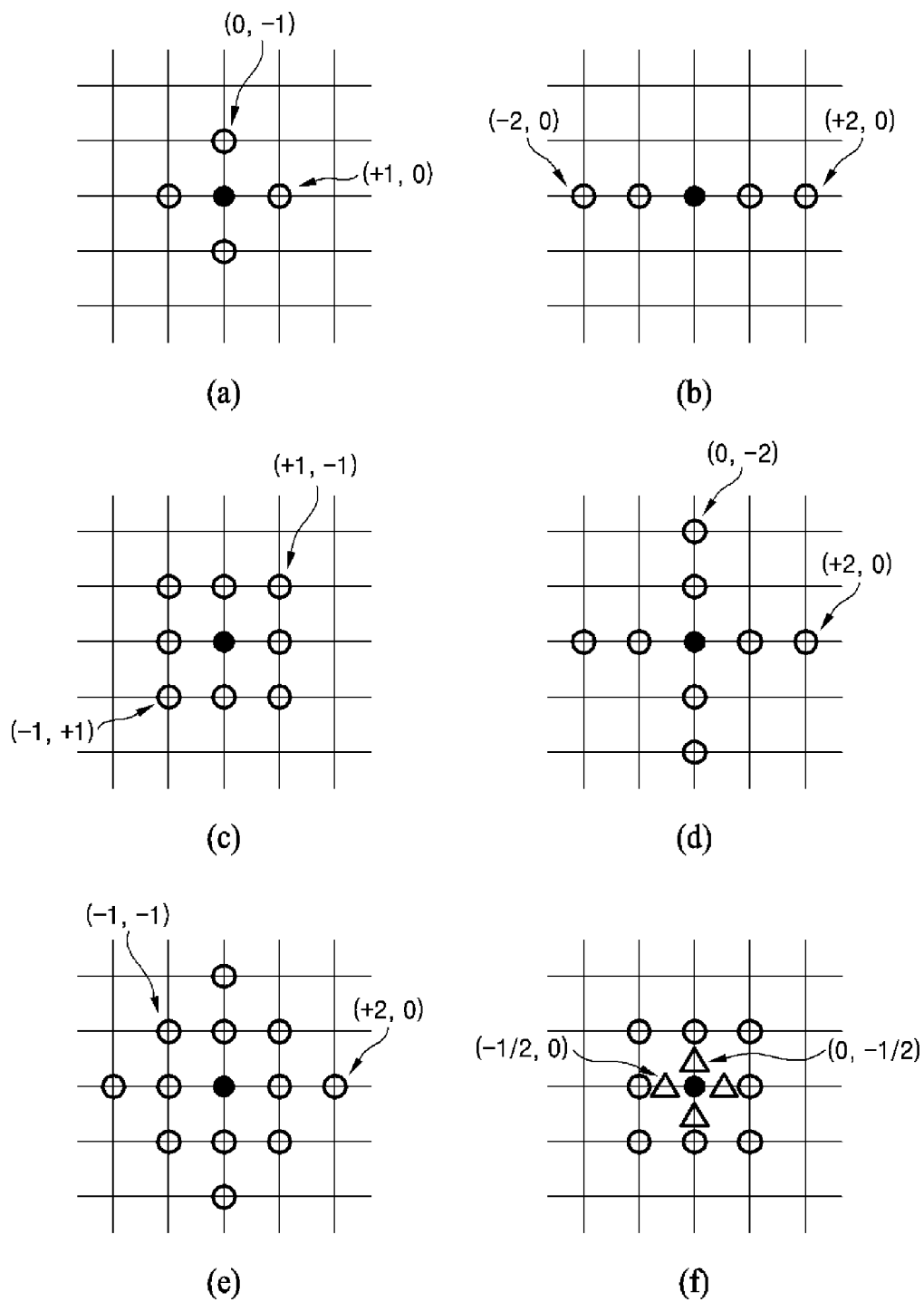
FIGS. 8 and 9 are diagrams illustrating various examples of offset vector candidates.
Figure 9:
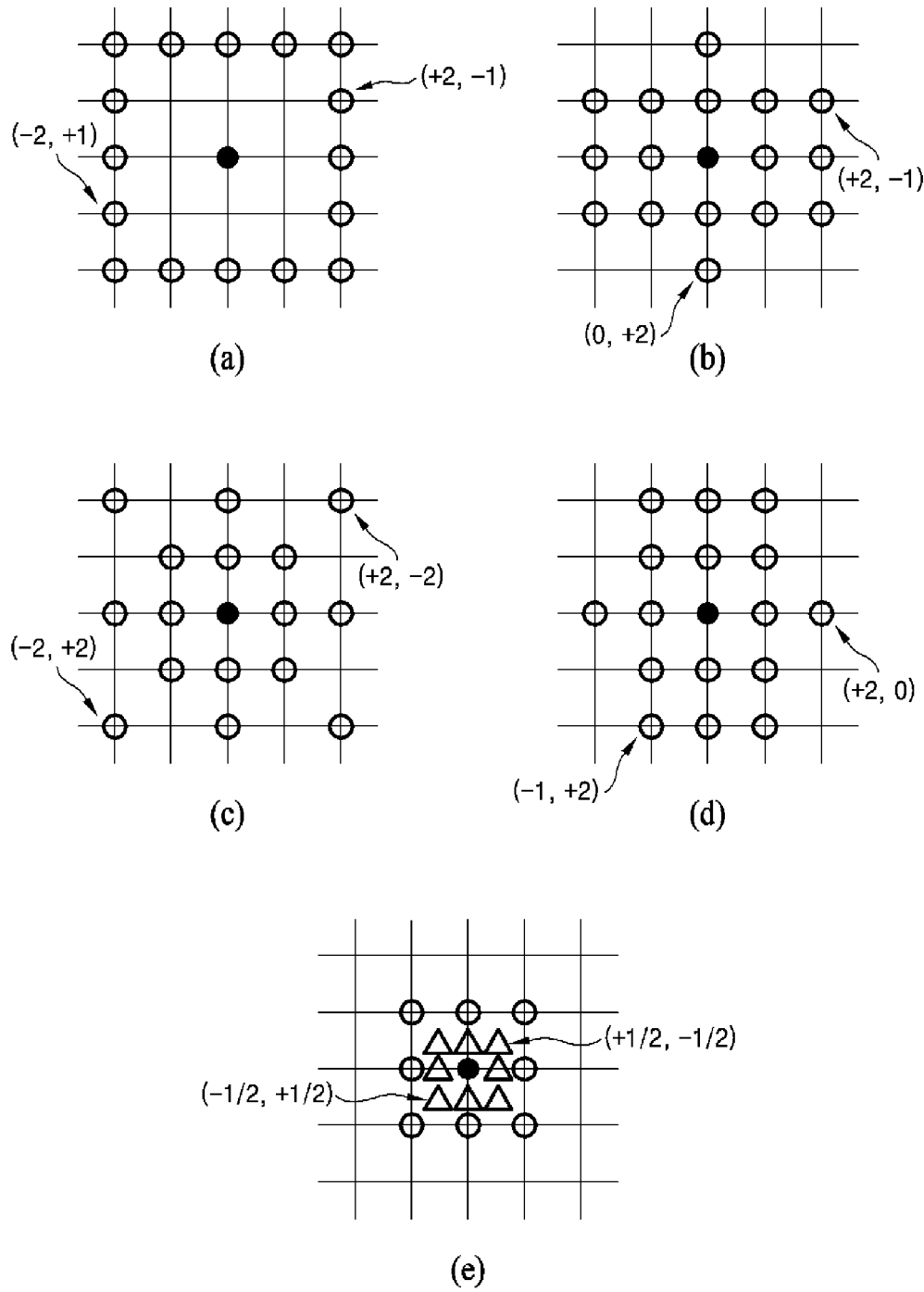

FIGS. 8 and 9 illustrate various examples of offset vector candidates that may be indicated by an offset index. FIGS. 8A and 8B correspond to examples of offset vector candidates when 4-point offset motion is allowed, and FIGS. 8C and 8D correspond to examples of offset vector candidates when 8-point offset motion is allowed. FIGS. 8E and 8F correspond to examples of offset vector candidates when 12-point offset motion is allowed, and FIGS. 9A to 9E correspond to examples of offset vector candidates when 16-point offset motion is allowed.

In FIGS. 8 and 9, one grid cell represents 1 pixel, a solid black circle represents the first position indicated by the first motion vector, a hollow black circle represents an offset vector candidate that may correspond to the second motion vector, and a hollow black triangle represents an offset vector candidate placed at a position of ½ pixel.

The following description assumes that the value of the first position is (0, 0). When 4-point offset motion is allowed (see FIGS. 8A and 8B), a total of four positions placed at (+1, 0), (−1, 0), (0, −1), and (0, +1) around the first position (0, 0) may correspond to offset vector candidates (FIG. 8A), and a total of four positions placed at (+1, 0), (+2, 0), (−1, 0), and (−2, 0) around the first position may correspond to offset vector candidates (FIG. 8B).

When 8-point offset motion is allowed (see FIGS. 8C and 8D), a total of eight positions placed at (+1, 0), (−1, 0), (0, −1), (0, +1), (1, −1), (1, +1), (−1, −1), and (−1, +1) around the first position (0, 0) may correspond to offset vector candidates (FIG. 8C), and a total of eight positions placed at (+1, 0), (+2, 0), (−1, 0), (−2, 0), (0, −1), (0, −2), (0, +1), and (0, +2) around the first position may correspond to offset vector candidates (FIG. 8D).

When 12-point offset motion is allowed, as shown in FIG. 8E, a total of 12 positions placed at (+1, 0), (+2, 0), (−1, 0), (−2, 0), (0, −1), (0, −2), (0, +1), (0, +2), (1, −1), (1, +1), (−1, −1), and (−1, +1) may correspond to offset vector candidates.

Also, as shown in FIG. 8F, eight positions placed at (+1, 0), (−1, 0), (0, −1), (0, +1), (+1, −1), (+1, +1), (−1, −1), and (−1, +1) and four positions placed at (+½, 0), (−½, 0), (0, −½), and (0, +½) around the first position may correspond to offset vector candidates.

As shown in FIG. 9A, a total of 16 positions placed at (+2, 0), (−2, 0), (0, +2), (0, −2), (+2, −1), (+2, −2), (+1, −2), (−1, −2), (−2, −2), (−2, −1), (−2, +1), (−2, +2), (−1, +2), (+1, +2), (+2, +2), and (+2, +1) around the first position may correspond to offset vector candidates.

Offset vector candidates may have various forms other than the examples shown in FIGS. 8 and 9 as long as relative positions can be expressed around the first position. For example, the offset vector candidates may be arranged to form an asymmetric shape rather than a symmetric shape around the first position.

The video encoding apparatus and the video decoding apparatus may predefine an arrangement form to be applied to actually predict a current block among various arrangement forms of the offset vector candidates. The arrangement form of the offset vector to be actually applied may be defined at one or more positions among higher levels (sequence-level, picture-level, tile group header, tile header, CTU header, and CU header) and may be defined in a block level.

The arrangement form of the offset vector candidates may be specified by the number of offset vector candidates, the motion magnitude of each of the offset vector candidates, and the motion direction of each of the offset vector candidates. Therefore, when at least one of the number of offset vector candidates, the motion magnitude of each of the offset vector candidates, and the motion direction of each of the offset vector candidates is configured differently, a different arrangement form may be decided.

The video encoding apparatus may transmit a bitstream including identification information for deciding one of the various arrangement forms, and the video decoding apparatus may decide an arrangement form, i.e., preset offset vector candidates, using the identification information included in the bitstream.

A method of deciding the second motion vector when offset information is implemented as an offset index as described above will be described below with reference to FIG. 7.

In the case of unidirectional prediction in FIG. 7A, the inter-predictor 444 may decide the second motion vector MV_0 by shifting the first motion vector MV_#0 according to an offset vector candidate offset_0 indicated by an offset index or by adding an offset vector candidate offset_0 indicated by an offset index to the first motion vector MV_#0.

In the case of bidirectional prediction in FIG. 7B, for the L0 direction, the inter-predictor 444 may decide the second motion vector MV_0 by shifting the first motion vector MV_#0 according to an offset vector candidate offset_0 indicated by an offset index or by adding an offset vector candidate offset_0 indicated by an offset index to the first motion vector MV_#0. For the L1 direction, the inter-predictor 444 may decide the second motion vector MV_1 by shifting the first motion vector MV_#1 according to an offset vector candidate −offset_0 indicated by an offset index or by adding an offset vector candidate −offset indicated by an offset index to a first motion vector MV_#1.

In some embodiments, scaling for an offset vector may be implemented based on time-axis distances between the current picture and two reference pictures ref_idx_#0 and ref_idx_#1. The inter-predictor 444 may decide the second motion vector MV_1 by scaling the offset vector candidate based on the time-axis distance between the current picture and ref_idx_#0 (a picture order count (POC) difference) and the time-axis distance between the current picture and ref_idx_#1 (a POC difference) and adding the scaled offset vector candidate to the first motion vector MV_#1.

Meanwhile, when offset information is implemented as an offset vector, the video encoding apparatus may generate and transmit a vector corresponding to the difference between the first position value and the second position value. In other words, the video encoding apparatus may transmit an offset vector indicating the direction and magnitude from the first position indicated by the selected merge index to the second position.

The video decoding apparatus may decide the second motion vector by applying the transmitted offset vector to the first motion vector. The offset vector corresponds to information for representing the second position relative to the first position, which is an origin, and thus may be understood as a motion vector difference (mvd).

The offset vector may be expressed using syntaxes representing magnitude direction. Also, the offset vector may be expressed using various forms of syntaxes representing magnitude and direction.

Table 1 below shows an example of representing the offset vector as syntaxes representing magnitude and direction.

TABLE 1

|  | Descriptor |
|---|---|
| mvd_coding( x0, y0, refList ) { |  |
|   abs_mvd_greater0_flag[ 0 ] | ae(v) |
|   abs_mvd_greater0_flag[ 1 ] | ae(v) |
|   if( abs_mvd_greater0_flag[ 0 ]) |  |
|     abs_mvd_greater1_flag[ 0 ] | ae(v) |
|   if( abs_mvd_greater0_flag[ 1 ]) |  |
|     abs_mvd_greater1_flag[ 1 ] | ae(v) |
|   if( abs_mvd_greater0_flag[ 0 ]){ |  |
|     if( abs_mvd_greater1_flag[ 0 ]) |  |
|       abs_mvd_minus2[ 0 ] | ae(v) |
|     mvd_sign_flag[ 0 ] | ae(v) |
|   } |  |
|   if( abs_mvd_greater0_flag[ 1 ]){ |  |
|     if( abs_mvd_greater1_flag[ 1 ]) |  |
|       abs_mvd_minus2[ 1 ] | ae(v) |
|     mvd_sign_flag[ 1 ] | ae(v) |
|   } |  |
| } |  |

In Table 1 above, abs_mvd_greater0_flag, abs_mvd_greater1_flag, and abs_mvd_minus2 are syntaxes representing the magnitude of the offset vector (mvd), and mvd_sign_flag is a syntax representing the direction of the offset vector.

In some embodiments, an example of additionally using mv_resolution information in addition to an offset vector may be implemented. mv_resolution may refer to the magnitude resolution that represents precision of the magnitude of the offset vector and may correspond to one of ¼-pixel, 1-pixel, and 4-pixel.

The mv_resolution information is additionally signaled from the video encoding apparatus to the video decoding apparatus and may be configured in various forms (a flag, an index, etc.) indicating the magnitude resolution of the offset vector. An example in which mv_resolution is implemented in the form of a flag will be described below.

When a first flag indicating ¼-pixel is on, mv_resolution is set to ¼-pixel, and when the first flag is off, the second flag is additionally analyzed to determine whether mv_resolution is 1-pixel or 4-pixel.

When mv_resolution is decided through such a determination process, actual motion is decided by the decided mv_resolution and magnitude. For example, when the magnitude of the vector is 2 and mv_resolution is 4-pixel, actual motion corresponds to 8-pixel. Also, when the magnitude of the vector is 4 and mv_resolution is ¼-pixel, actual motion corresponds to 1-pixel.

A method of deciding the second motion vector when offset information is implemented as an offset vector as described above will be described below with reference to FIG. 7.

In the case of unidirectional prediction in FIG. 7A, the inter-predictor 444 may decide the second motion vector MV_0 by shifting the first motion vector MV_#0 according to direction and magnitude indicated by an offset vector offset_0.

In the case of bidirectional prediction in FIG. 7B, for the L0 direction, the inter-predictor 444 may decide the second motion vector MV_0 by shifting the first motion vector MV_#0 according to direction and magnitude indicated by an offset vector offset_0. For the L1 direction, the inter-predictor 444 may decide the second motion vector MV_1 by shifting the first motion vector MV_#1 according to direction and magnitude indicated by an offset vector −offset_0.

In some embodiments, scaling for an offset vector may be implemented based on time-axis distances (POC differences) between the current picture and two reference pictures ref_idx_#0 and ref_idx_#1. For example, when the POC difference between the current picture and the reference picture ref_idx_#0 of L0 is 1 and the POC difference between the current picture and the reference picture ref_idx_#1 of L1 is 2, the L0-direction offset vector may be (x, y), and the L1-direction offset vector may be (−2*x, −2*y).

The video encoding apparatus may be configured to separately transmit prediction direction information in addition to the offset information. The video decoding apparatus may determine a prediction direction of the current block using the transmitted prediction direction information. Based on the determined prediction direction, the video decoding apparatus may apply offset information for each direction or construct a merge candidate list only with neighboring blocks having the same direction as the determined prediction direction of the current block.

An example of applying offset information for each prediction direction determined through the prediction direction information will be described using FIGS. 10 and 11 first, and then an example of constructing a merge candidate list only with neighboring blocks corresponding to the prediction direction determined through the prediction direction information will be described using FIG. 12.

Figure 10:
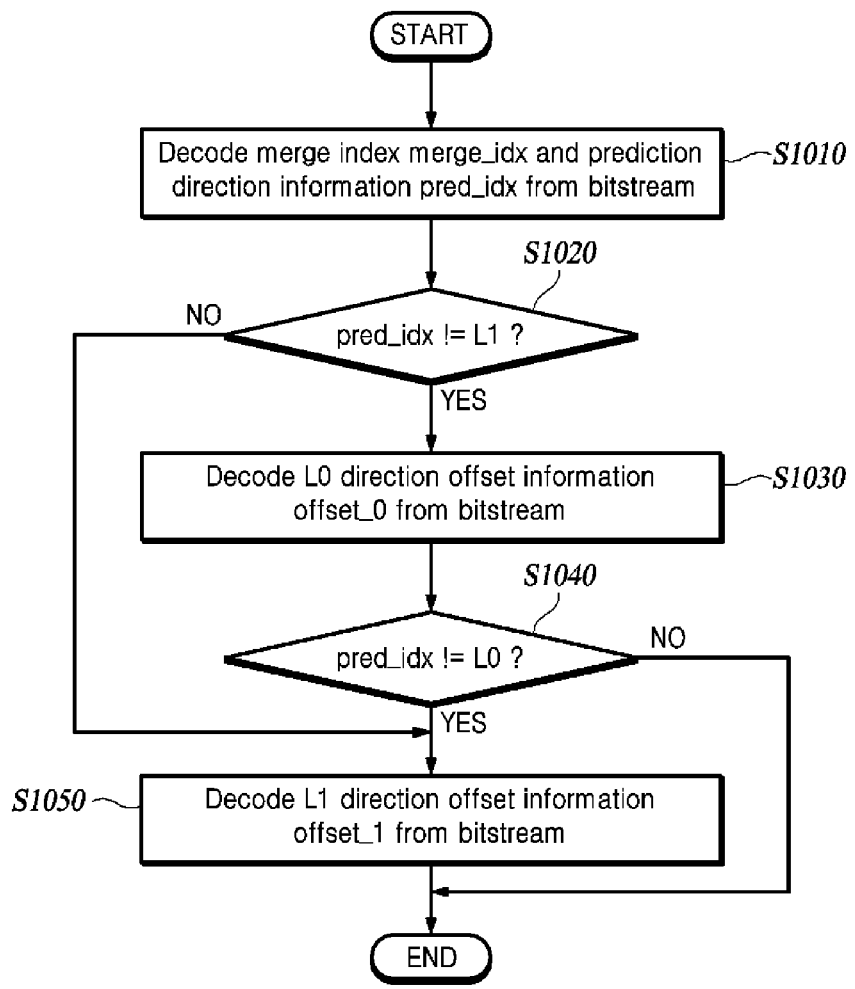
FIG. 10 is a flowchart illustrating an example of a method of predicting a current block using offset information and prediction direction information.

As shown in FIG. 10, the decoder 410 decodes a merge index merge_idx and prediction direction information pred_idx from a bitstream (S1010). Here, the prediction direction information does not correspond to information derived from the motion information of the selected merge candidate but corresponds to information separately transmitted from the video encoding apparatus.

In association with the order in which merge_idx and pred_idx are transmitted from the video encoding apparatus, it is possible to implement both of the case in which merge_idx is transmitted first and then pred_idx is transmitted and the case in which pred_idx is transmitted first and then merge_idx is transmitted.

The prediction direction determination unit 540 determines the prediction direction of the current block on the basis of the decoded prediction direction information (S1020, S1040). The prediction direction information may be a flag indicating unidirectional prediction or bidirectional prediction or may be a value representing one of L0, L1, and both.

When the prediction direction information is a value representing one of L0, L1, and both, the prediction direction determination unit 540 determines the prediction direction of the current block by determining whether the prediction direction information is not equal to the L1 direction (S1020) and whether the prediction direction information is not equal to the L0 direction (S1040) as shown in FIG. 10.

When it is determined that the prediction direction information is not equal to the L1 direction through S1020, the prediction direction indicated by the prediction direction information may correspond to the L0 direction or both directions (i.e., at least corresponds to the L0 direction). In this case, the video encoding apparatus may transmit a bitstream including L0 direction offset information offset_0, and the video decoding apparatus may decode the L0 direction offset information offset_0 from the bitstream (S1030). Here, offset_0 may correspond to one of offset_idx and mvd, for the L0 direction.

When it is determined that the prediction direction information is not equal to the L0 direction through S1040, the prediction direction indicated by the prediction direction information may correspond to both directions. In this case, the video encoding apparatus may transmit a bitstream including L1 direction offset information offset_1, and the video decoding apparatus may decode the L1 direction offset information offset_1 from the bitstream (S1050). Here, offset_1 may correspond to one of offset_idx and mvd, for the L1 direction.

Returning to S1020, when it is determined that the prediction direction information is equal to the L1 direction, the prediction direction indicated by the prediction direction information corresponds to an L1 uni-direction. Therefore, the video encoding apparatus may transmit a bitstream including only L1 direction offset information, and the video decoding apparatus may decode the L1 direction offset information from the bitstream (S1050).

In S1040, when it is determined that the prediction direction information is equal to the L0 direction, the prediction direction indicated by the prediction direction information corresponds to an L0 uni-direction. Therefore, the video encoding apparatus may transmit a bitstream including only L0 direction offset information, and the video decoding apparatus may decode the L0 direction offset information from the bitstream.

When the offset information is decoded through S1010 to S1050, the process of selecting a merge candidate corresponding to the merge index and the processes of deciding the second motion vector may be performed for each direction corresponding to the offset information.

For example, when the offset information is implemented in the form of an offset index offset_idx, an L1 direction second motion vector may be decided by applying an offset vector candidate indicated by an L1 direction offset index to an L1 direction first motion vector. Also, an L0 direction second motion vector may be decided by applying an offset vector candidate indicated by an L0 direction offset index to an L0 direction first motion vector.

Figure 11:
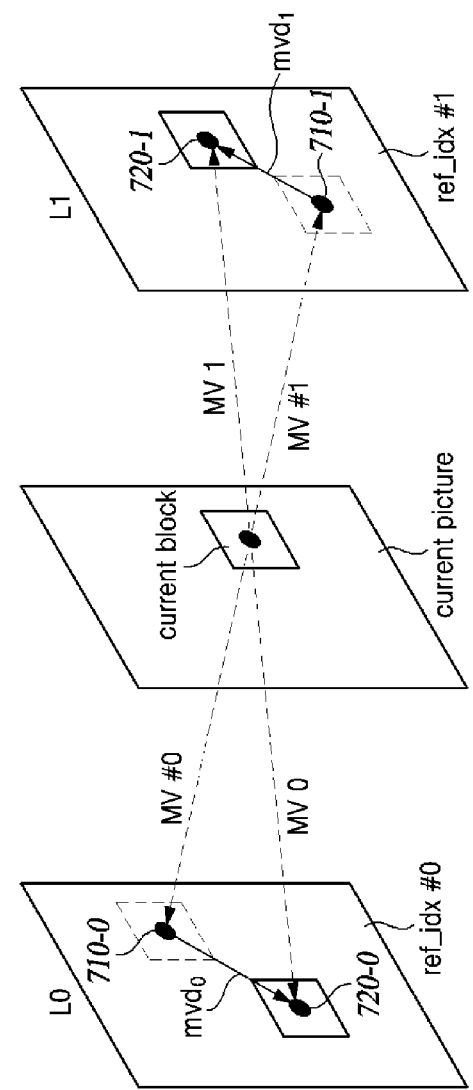
FIG. 11 is a diagram illustrating an example of a method of predicting a current block using offset information and prediction direction information.

In connection with another example, a case in which the offset information is implemented in the form of an offset vector mvd is illustrated in FIG. 11. In FIG. 11, mvd0 represents an L0 direction offset vector, and mvd1 represents an L1 direction offset vector.

As illustrated in FIG. 11, an L0 direction second motion vector MV_0 may be decided by shifting an L0 direction first motion vector MV_#0, from a first position 710-0 indicated by the first motion vector MV_#0 to a second position 720-0, according to an L0 direction offset vector mvd0. Also, an L1 direction second motion vector MV_1 may be decided by shifting an L1 direction first motion vector MV_#1, from a first position 710-1 to a second position 720-1, according to an L1 direction offset vector mvd1.

When the prediction direction information indicates bidirectional prediction and a second motion vector is decided for each of the two directions, the generation unit 530 may generate a prediction block of the current block by averaging the two second motion vectors or by performing weighted prediction on the second motion vectors.

Meanwhile, the prediction direction information may be used as a criterion for a method of constructing a merge candidate list. FIG. 12 illustrates an example of a method of constructing the merge candidate list using prediction direction information.

Figure 12:
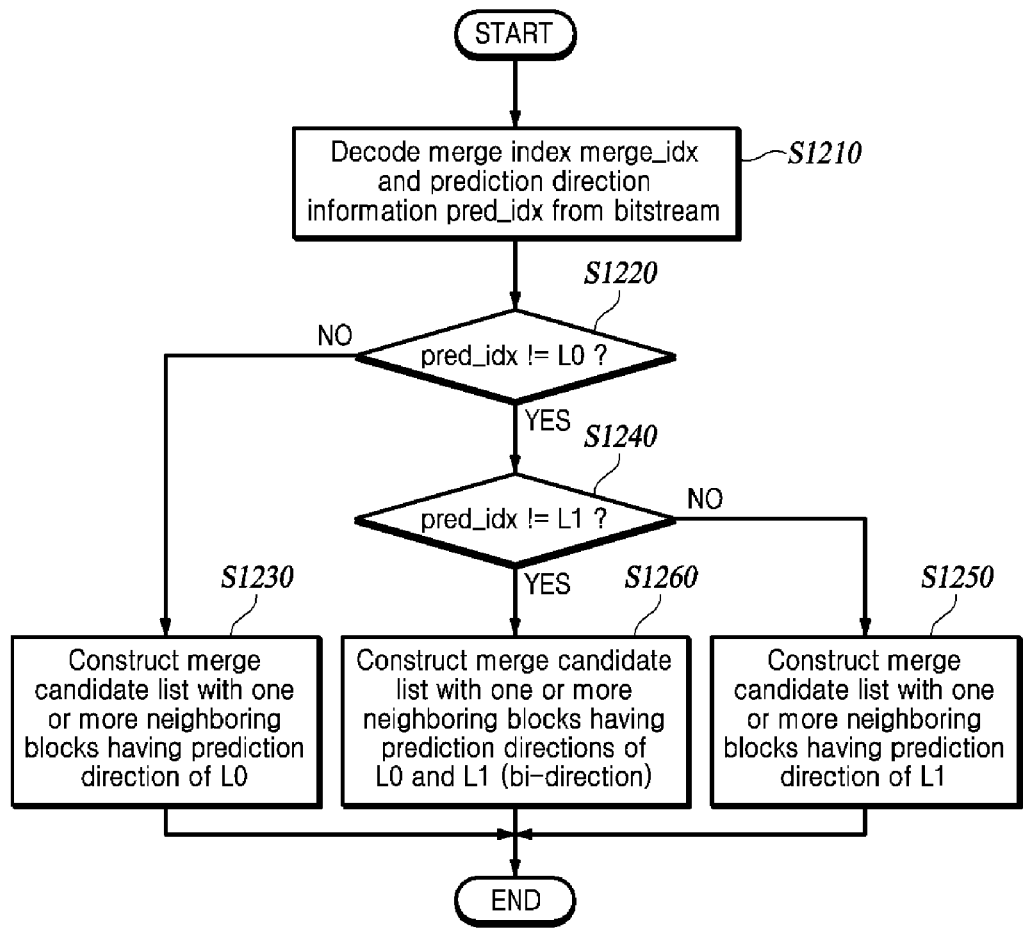
FIG. 12 is a flowchart illustrating an example of a method of constructing a merge candidate list on the basis of prediction direction information.

As illustrated in FIG. 12, a process of decoding a merge index merge_idx and prediction direction information pred_idx from a bitstream (S1210) and a process of determining whether the decoded prediction direction information is not equal to the L0 direction (S1220) may be performed.

In association with the order in which merge_idx and pred_idx are transmitted from the video encoding apparatus, it is possible to implement both of the case in which merge_idx is transmitted first and then pred_idx is transmitted and the case in which pred_idx is transmitted first and then merge_idx is transmitted.

When it is determined that the prediction direction information is equal to the L0 direction, the prediction direction of the current block corresponds to L0 uni-direction. The list construction unit 550 constructs a merge candidate list with one or more neighboring blocks having a prediction direction of L0 among the neighboring blocks of the current block (S1230). That is, the list construction unit 550 constructs a merge candidate list such that neighboring blocks having a prediction direction of L0 are included as merge candidates.

Alternatively, when it is determined that the prediction direction information is not equal to the L0 direction, the prediction direction of the current block may correspond to L1 uni-direction or bi-direction. Therefore, a process of determining whether the prediction direction information is not equal to the L1 direction (S1240) is further performed.

When it is determined that the prediction direction information is equal to the L1 direction, the prediction direction of the current block corresponds to L1 uni-direction. The list construction unit 550 constructs a merge candidate list such that neighboring blocks having a prediction direction of L1 are included as merge candidates (S1250).

Alternatively, when it is determined that the prediction direction information is equal to the L1 direction, the prediction direction of the current block corresponds to bi-direction. Therefore, the list construction unit 550 constructs a merge candidate list such that neighboring blocks having prediction direction of bi-direction s are included as merge candidates.

As described above, when the prediction direction information is used as a criterion for constructing the merge candidate list, the merge candidate list may be constructed by including only neighboring blocks having a prediction direction corresponding to the prediction direction information as merge candidates. Therefore, the method of constructing the merge candidate list can be implemented more adaptively to the actual prediction direction of the current block.

The activation/deactivation of the above-described methods may be controlled with a syntax element (e.g., sps_mmvd_enabled_flag) defined at one or more positions among higher levels (sequence-level, picture-level, tile group header, tile header, CTU header, and CU header). Also, the above-described methods may be implemented in a modified merge mode that replaces the conventional merge mode or in a new mode (proposed mode, mmvd: merge with mvd) independent of the conventional merge mode.

No additional syntax element for the various methods proposed by the present invention is required when the methods are implemented in the mode modified from the conventional merge mode. However, an additional syntax element for the various methods may be required when the methods are implemented in the new mode separate from the conventional merge mode.

Figure 13:
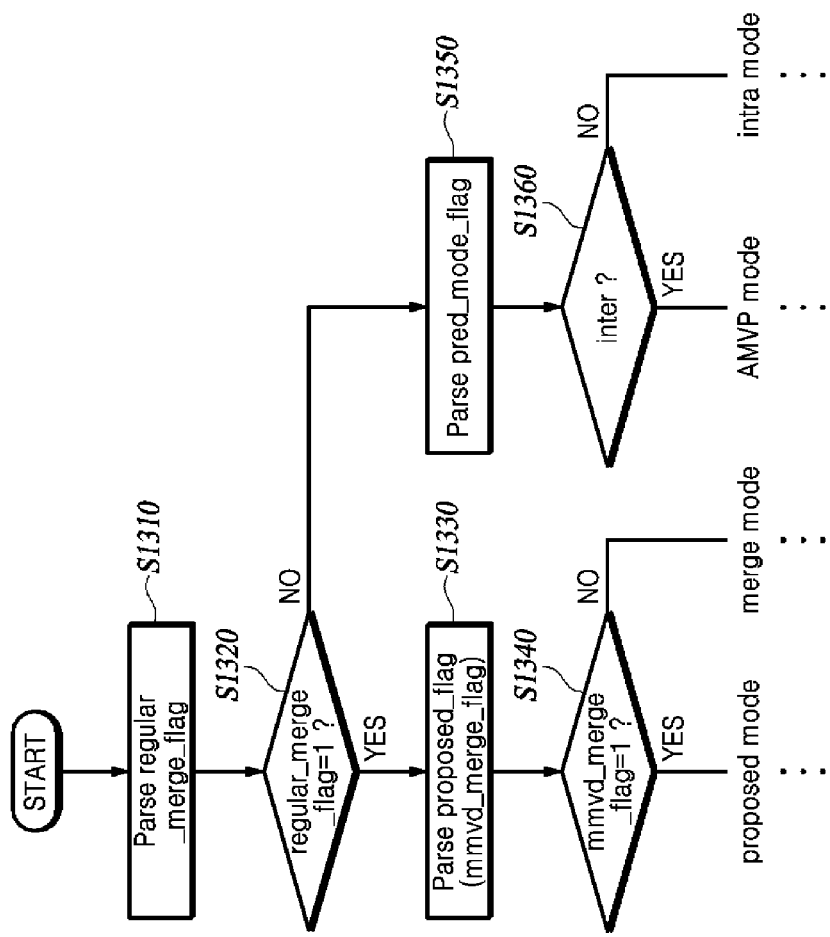
FIGS. 13 and 14 are flowcharts illustrating a method of implementing the present invention in an independent mode.
Figure 14:
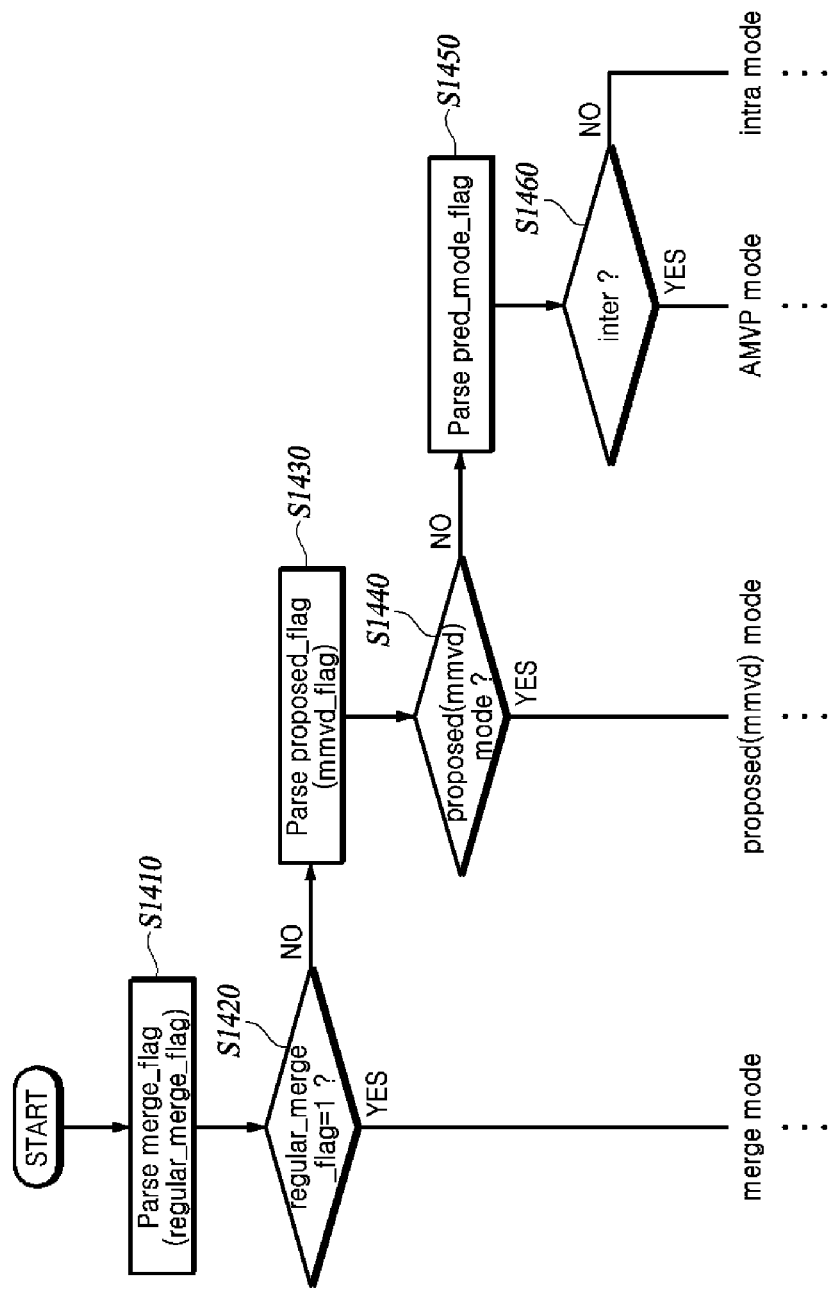

FIG. 13 shows a syntax structure when the conventional merge mode and the proposed mode are classified into the same mode group, and FIG. 14 shows a syntax structure when the conventional merge mode and the proposed mode are classified into different mode groups.

First, as illustrated in FIG. 13, a process of parsing or decoding a merge flag regular_merge_flag (S1310) and a process of determining a value of the merge flag (S1320) are performed. Here, the merge flag corresponds to information indicating whether the current block is predicted as a group including the conventional merge mode and the proposed mode.

When it is determined that the value of the merge flag indicates that the prediction mode of the current block corresponds to one of the conventional merge mode or the proposed mode, a process of parsing or decoding a flag proposed_flag (mmvd_merge_flag) indicating whether the current block is predicted in the proposed mode (S1330) and a process of determining a value of mmvd_merge_flag (S1340) are performed.

As a result, the conventional merge mode prediction is performed on the current block when the current block is predicted in the conventional merge mode (mmvd_merge_flag=0), and the proposed mode (mmvd mode) prediction is performed on the current block when the current block is predicted in the proposed mode.

Referring to S1320, when it is determined that the value of the merge flag indicates that the current block does not correspond to the conventional merge mode or the proposed mode, a process of parsing or decoding a flag pred_mode_flag, which is for distinguishing between inter-prediction and intra-prediction of the current block (S1350), and a process of determining a value of the corresponding flag (S1360) are performed.

When the current block is predicted in an inter-mode (AMVP mode), inter-mode (AMVP mode) prediction is performed on the current block. When the current block is predicted in an intra-mode, intra-mode prediction is performed on the current block.

Next, a syntax structure for a case in which the conventional merge mode and the proposed mode are classified into different mode groups will be described.

As illustrated in FIG. 14, a process of parsing or decoding a merge flag regular_merge_flag (S1410) and a process of determining a value of the merge flag (S1420) are performed in the same manner as described above. Since the example of FIG. 14 corresponds to a case in which the conventional merge mode and the proposed mode are classified into different groups, the merge flag of FIG. 14 corresponds to information indicating whether the current block has been predicted in the conventional merge mode.

When it is determined that the value of the merge flag indicates that the current block is predicted in the conventional merge mode (regular_merge_flag=1), the conventional merge mode prediction (merge mode) is performed on the current block. Alternatively, when it is determined that the current block is not predicted in the conventional mode (regular_merge_flag=0), a process of parsing or decoding a flag mmvd_flag indicating whether the current block is predicted in the proposed mode (S1430) and a process of determining a value of mmvd_flag (S1440) are performed.

When the current block is predicted in the proposed mode, proposed mode (mmvd) prediction is performed on the current block. Alternatively, when the current block is not predicted in the proposed mode, AMVP mode prediction or intra-mode prediction is performed through a process of parsing or decoding pred_mode_flag (S1450) and a process of analyzing the corresponding flag (1460).

Although exemplary embodiments of the present invention have been described for illustrative purposes, those skilled in the art will appreciate that and various modifications and changes are possible, without departing from the idea and scope of the invention. Exemplary embodiments have been described for the sake of brevity and clarity. Accordingly, one of ordinary skill would understand that the scope of the present invention is not limited by the embodiments explicitly described above but is inclusive of the claims and equivalents thereto.

What is claimed is:

1. A video decoding method for decoding a sequence of pictures, the method comprising:
   decoding, at a sequence level of a bitstream, enabling information indicating whether a first coding tool of a plurality of coding tools is allowed for the sequence;
   decoding, at a picture level associated with a current picture to be decoded, group identification information when the enabling information indicates that the first coding tool is allowed for the sequence, and thereby selecting a candidate set to be used for blocks in the current picture from a plurality of candidate sets;
   decoding, at a block level associated with a current block in the current picture, an mmvd flag indicating whether the first coding tool has been applied to the current block, depending on the enabling information; and
   when the mmvd flag indicates that the first coding tool has been applied to the current block,
      decoding, at the block level, a merge candidate identification information and offset information;
      selecting a merge candidate corresponding to the merge candidate identification information from a merge candidate list which includes merge candidates derived from neighboring blocks of the current block;
      deriving, using the offset information, an offset vector for the current block from a plurality of offset vectors defined by the candidate set which is selected at the picture level by the group identification information;
      deciding at least one motion vector of the current block by applying the offset vector to at least one motion vector of the selected merge candidate; and
      predicting the current block using the at least one motion vector of the current block,
   wherein, when the selected merge candidate is a pre-decoded block that has been bi-predicted using two motion vector, the deciding the at least one motion vector of the current block comprises:
      adding the offset vector indicated by the offset information to a motion vector for a specific prediction direction of the selected merge candidate to decide a motion vector for the specific prediction direction of the current block;
      scaling the offset vector indicated by the offset information, based on a ratio of a time-axis distance between a current picture and a reference picture for the specific prediction direction referenced by the selected merge candidate and a time-axis distance between the current picture and a reference picture for the other prediction direction referenced by the selected merge candidate; and adding the scaled offset vector to a motion vector for the other prediction direction of the selected merge candidate to decide a motion vector for the other prediction direction of the current block.

2. The inter-prediction method of claim 1,
wherein the plurality of offset vectors are defined by pre-determined motion magnitudes and pre-determined motion directions,
wherein the offset information comprises a first index for indicating one among the pre-determined motion magnitudes and a second index for indicating one among the pre-determined motion directions.

3. The inter-prediction method of claim 1, further comprising
decoding, at the block level, a merge flag indicating whether the current block is predicted in a merge mode,
wherein the mmvd flag is decoded when the merge flag indicates that the current block is predicted in the merge mode.

4. The inter-prediction method of claim 1, wherein the offset information is an offset vector for indicating a position indicated by the motion vector of the current block relative to a position, which is set as an origin, indicated by the at least one motion vector of the selected merge candidate.

5. The inter-prediction method of claim 1, further comprising:
determining a prediction direction of the current block on the basis of prediction direction information included in the bitstream; and
constructing the merge candidate list with neighboring blocks having a prediction direction corresponding to the determined prediction direction among the neighboring blocks.

6. The inter-prediction method of claim 1, further comprising determining a prediction direction of the current block on the basis of prediction direction information included in the bitstream,
wherein the extracting comprises extracting offset information for the determined prediction direction.

7. A video encoding method for encoding a sequence of pictures, the method comprising:
encoding, at a sequence level, enabling information indicating whether a first coding tool of a plurality of coding tools is allowed for the sequence;
encoding, at a picture level associated with a current picture to be encoded, group identification information when the enabling information indicates that the first coding tool is allowed for the sequence, wherein the group identification information is information for selecting a candidate set to be used for blocks in the current picture from a plurality of candidate sets;
encoding, at a block level associated with a current block in the current picture, an mmvd flag indicating whether the first coding tool is applied to the current block, depending on the enabling information; and
when the mmvd flag indicates that the first coding tool is applied to the current block, performing a predictive encoding for the current block using the first coding tool,
wherein the predictive encoding comprises:
selecting a merge candidate from a merge candidate list which includes merge candidates derived from neighboring blocks of the current block;
selecting an offset vector for the current block from a plurality of offset vectors defined by the candidate set which is selected at the picture level;
deriving at least one motion vector of the current block and generating a prediction block of the current block using the at least one motion vector, wherein the at least one motion vector is set equal to at least one value generated by applying the selected offset vector to at least one motion vector of the selected merge candidate; and
encoding, at the block level, a merge candidate flag for indicating the selected merge candidate and offset information for indicating the selected offset vector,
wherein, when the selected merge candidate is a pre-decoded block that has been bi-predicted using two motion vector, the deriving the at least one motion vector of the current block comprises:
adding the selected offset vector corresponding to the offset information to a motion vector for a specific prediction direction of the selected merge candidate to decide a motion vector for the specific prediction direction of the current block;
scaling the selected offset vector corresponding to the offset information, based on a ratio of a time-axis distance between the current picture and a reference picture for the specific prediction direction referenced by the selected merge candidate and a time-axis distance between the current picture and a reference picture for the other prediction direction referenced by the selected merge candidate; and
adding the scaled offset vector to a motion vector for the other prediction direction of the selected merge candidate to decide a motion vector for the other prediction direction of the current block.

8. A non-transitory computer readable medium storing a bitstream generated by a video encoding method for encoding a sequence of pictures, the method comprising:
encoding, at a sequence level, enabling information indicating whether a first coding tool of a plurality of coding tools is allowed for the sequence;
encoding, at a picture level associated with a current picture to be encoded, group identification information when the enabling information indicates that the first coding tool is allowed for the sequence, wherein the group identification information is information for selecting a candidate set to be used for blocks in the current picture from a plurality of candidate sets;
encoding, at a block level associated with a current block in the current picture, an mmvd flag indicating whether the first coding tool is applied to the current block, depending on the enabling information; and
when the mmvd flag indicates that the first coding tool is applied to the current block, performing a predictive encoding for the current block using the first coding tool,
wherein the predictive encoding comprises:
selecting a merge candidate from a merge candidate list which includes merge candidates derived from neighboring blocks of the current block;
selecting an offset vector for the current block from a plurality of offset vectors defined by the candidate set which is selected at the picture level;
deriving at least one motion vector of the current block and generating a prediction block of the current block using the at least one motion vector, wherein the at least one motion vector is set equal to at least one value generated by applying the selected offset vector to at least one motion vector of the selected merge candidate; and encoding, at the block level, a merge candidate flag for indicating the selected merge candidate and offset information for indicating the selected offset vector, wherein, when the selected merge candidate is a pre-decoded block that has been bi-predicted using two motion vector, the deriving the at least one motion vector of the current block comprises:

adding the selected offset vector corresponding to the offset information to a motion vector for a specific prediction direction of the selected merge candidate to decide a motion vector for the specific prediction direction of the current block;

scaling the selected offset vector corresponding to the offset information, based on a ratio of a time-axis distance between the current picture and a reference picture for the specific prediction direction referenced by the selected merge candidate and a time-axis distance between the current picture and a reference picture for the other prediction direction referenced by the selected merge candidate; and adding the scaled offset vector to a motion vector for the other prediction direction of the selected merge candidate to decide a motion vector for the other prediction direction of the current block.

* * * * *